Figure 1:
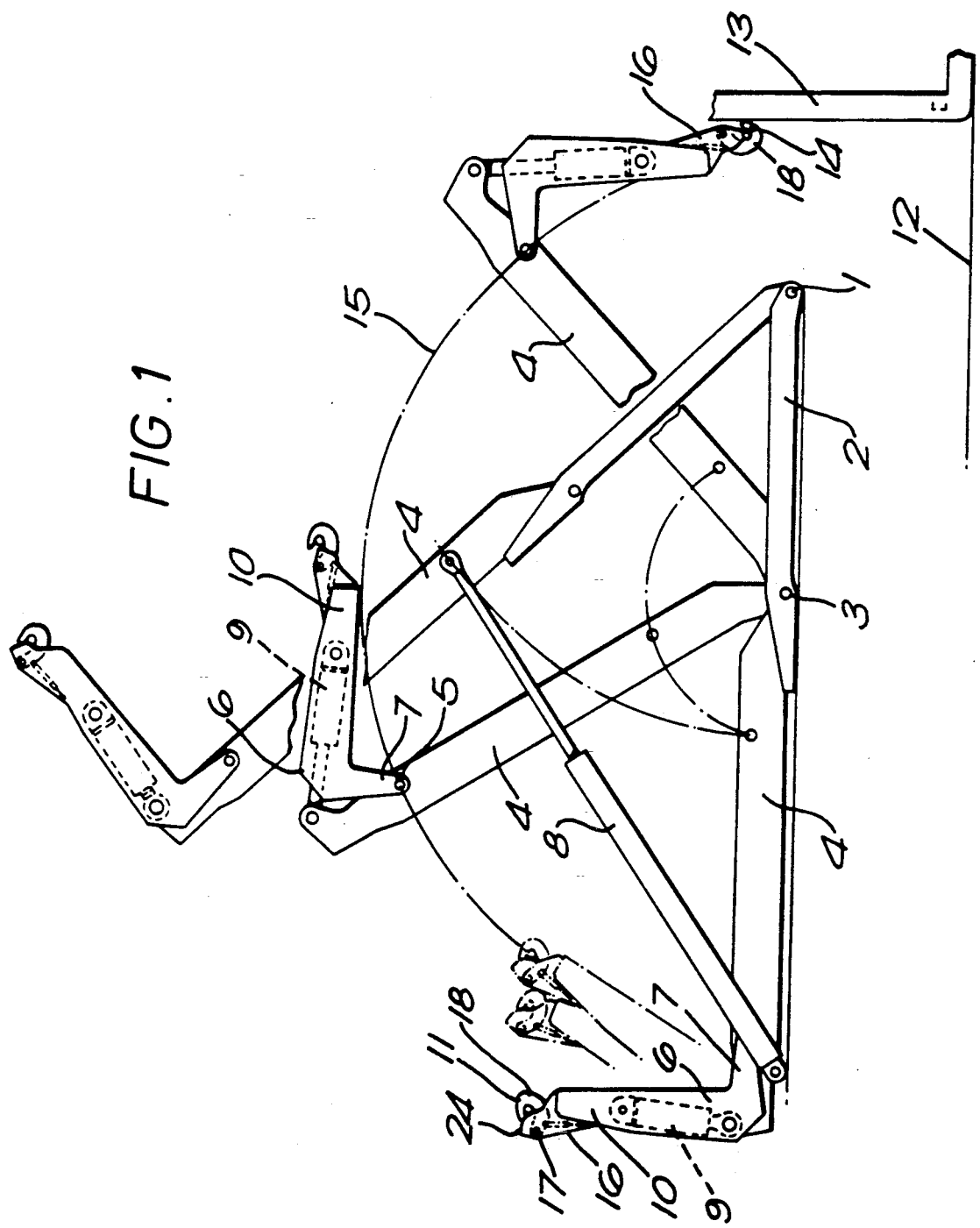

United States Patent [19]
Raisio

[11] Patent Number: 5,102,284
[45] Date of Patent: Apr. 7, 1992

[54] METHOD AND EQUIPMENT FOR THE TRANSFER OF A CARGO SPACE ONTO A VEHICLE AND OFF THE VEHICLE

[75] Inventor: Reijo Raisio, Perniö, Finland

[73] Assignee: Multilift Oy, Raisio, Finland

[21] Appl. No.: 458,241

[22] Filed: Dec. 27, 1989

[30] Foreign Application Priority Data

Jan. 2, 1989 [FI] Finland .................................. 890002

[51] Int. Cl.⁵ .............................................. B60P 1/14
[52] U.S. Cl. ..................................... 414/498; 414/546
[58] Field of Search ............... 414/546, 498, 499, 500, 414/547, 553, 554, 555; 294/82.17, 82.2, 82.18, 82.19, 82.21, 82.22, 82.23

[56] References Cited

U.S. PATENT DOCUMENTS

| | | |
|---|---|---|
| 2,429,769 | 10/1947 | Petouhoff . |
| 3,819,075 | 6/1974 | Derain . |
| 3,874,537 | 4/1975 | Kou ................................ 414/498 X |
| 4,290,726 | 9/1981 | Sutela et al. ........................ 414/421 |

FOREIGN PATENT DOCUMENTS

| | | |
|---|---|---|
| 2726353 | 12/1978 | Fed. Rep. of Germany . |
| 2903462 | 8/1980 | Fed. Rep. of Germany . |
| 3312558 | 10/1984 | Fed. Rep. of Germany ...... 414/498 |
| 3426310 | 2/1986 | Fed. Rep. of Germany ...... 414/546 |
| 88158004 | 3/1989 | Fed. Rep. of Germany . |
| 63350 | 2/1983 | Finland . |
| 75121 | 3/1984 | Finland . |
| 2109109 | 5/1972 | France . |
| 2397304 | 2/1979 | France . |
| 2540804 | 8/1984 | France ............................. 414/498 |
| 73713 | 6/1978 | Japan ................................ 414/546 |
| 2064470 | 6/1981 | United Kingdom . |
| 2170184 | 7/1986 | United Kingdom ................ 414/498 |

Primary Examiner—Frank E. Werner
Attorney, Agent, or Firm—Burns, Doane, Swecker & Mathis

[57] ABSTRACT

Method and equipment for the transfer of a cargo space (13) onto a vehicle and off the vehicle. The loading device comprises an L-shaped piece (6), the upper end of the vertical arm (10) of said piece (6) being provided with a grasping hook (11), and the rear end of the horizontal arm (7) or of its extension (4) being provided with a transverse pivot shaft (3), around which the L-shaped piece is pivoted by means of an actuator (8). The grasping hook (11) pivots around a transverse shaft (17) relative the vertical arm (10) of the L-shaped piece (6) during the movement of transfer of the cargo space (13). The vertical arm (10) or an extension (16) of the vertical arm of the L-shaped piece (6) is provided with a projection (24), in relation to which the grasping hook (11) moves when it pivots relative the vertical arm (10) of the L-shaped piece (6). In a certain position of the grasping hook (11), the projection (24) on the vertical arm is positioned at least partly in front of the open gap of the grasping hook (11), and when the grasping hook (11) has been pivoted away from this position, the projection allows the open gap of the hook to remain at least substantially open.

7 Claims, 4 Drawing Sheets

METHOD AND EQUIPMENT FOR THE TRANSFER OF A CARGO SPACE ONTO A VEHICLE AND OFF THE VEHICLE

The present invention concerns a method for the transfer of a cargo space onto a vehicle and off the vehicle, whereby a loading device is used which includes an L-shaped piece, the upper end of the vertical arm of said L-shaped piece being provided with a grasping hook, and the rear end of the horizontal arm being provided with a transverse pivot shaft, around which the L-shaped piece is pivoted by means of an actuator, and the grasping hook pivoting around a transverse shaft in relation to the vertical arm of the L-shaped piece during movement of transfer of the cargo space. The invention also concerns an equipment for the transfer of a cargo space onto a vehicle and off the vehicle, said equipment including an L-shaped piece, at which a grasping hook is provided at the upper end of the vertical arm of the L-shaped piece and a transverse pivot shaft is provided at the rear end of the horizontal arm, whereby the L-shaped piece can be pivoted around said pivot shaft by means of an actuator, and whereby the grasping hook can be pivoted around a transverse shaft relative the vertical arm of the L-shaped piece during movement of transfer of the cargo space by the effect of a force applied to the grasping hook.

Various loading devices are known, which comprise an L-shaped piece at which the upper end of its vertical branch is provided with a grasping hook for grasping hold of the grasping loop on the cargo space. Such devices are described, e.g., in the Finnish Patent No. 63,350 and in the French Patent 2,109,109. In the device of the FI Pat. 63,350 the horizontal shifting of the load before its lowering is produced by pivoting the L-piece. In the device of the French Pat. 2,109,109, the corresponding movement is produced by shifting the L-piece telescopically.

Hook devices are also known wherein the grasping hook can pivot around a transverse shaft relative the vertical arm of the L-piece. In the Finnish Patent No. 75,121, such a device is described.

From the FR Published Patent Application No. 2,397,304, a loading device is known wherein the grasping hook is attached to the upper end of the L-piece by means of two transverse pins. One of these pins is detachable. When this pin is detached, the grasping hook can pivot rearwards, in which case the grasping hook can be detached from the cargo platform that has been raised to a horizontal position standing on its legs.

In the devices known in prior art, the transfer of the cargo onto and off the vehicle usually takes place when the grasping hook is attached rigidly to the vertical arm of the L-piece. When the L-piece in the device in accordance with the Finnish Patent No. 63,350 pivots around the shaft placed at the rear part of its horizontal arm, horizontal shifting of the load rearwards is obtained before the load starts being lowered off the vehicle. In order that the cargo space or exchange platform should move horizontally during this pivoting movement of the L-piece, a hook is required that is provided with a long cavity or gap, wherein the grasping loop or arc of the cargo space or platform can move relative the hook. Both when the load is being pulled onto the vehicle and when it is being removed off the vehicle, the arc of the cargo space moves in the cavity back and forth, whereby both the hook and the arc are abraded.

When the hook part is fixed as immobile in relation to the L-piece (e.g., by means of pins or welding), the arc of the platform and the hook pivot in relation to each other when the platform is being pulled onto the vehicle and removed off the vehicle. In such a case, the arc of the platform and the hook tend to be worn because of the high surface pressure.

Moreover, the hook part includes a safety lock pivoting around an articulation pin, which closes the gap of the hook and prevents detaching of the platform during pulling-on and lowering. As a rule, the safety lock operates automatically by the effect of gravity. It is a drawback of such a pivoting safety lock that it is readily made immobile by rust or is otherwise damaged. Moreover, in trailer operation the hook frame remains at such a high level that the safety lock is not opened automatically. This is why an actuator (e.g. a hydraulic or pneumatic cylinder) is needed to open the safety lock. Since the use of a trailer is becoming more and more common, this is a problem. On the other hand, the significance of a safety lock becomes higher as a consequence of both the product liability act and of other legislation, so that reliable operation of the safety lock is particularly important.

The method of the present invention is characterized in that the vertical arm or an extension of the vertical arm of the L-shaped piece is provided with a projection, in relation to which the grasping hook moves when it pivots relative the vertical arm of the L-shaped piece, whereby, at a certain position of the grasping hook, the projection on the vertical arm is positioned at least partly in front of the open gap of the grasping hook and, when the grasping hook has been pivoted away from this position, said projection allows the open gap in the hook to remain at least substantially open. The equipment in accordance with the invention is characterized in that the vertical arm or an extension of the vertical arm of the L-shaped piece is provided with a projection, which is, at a certain position of the grasping hook, positioned at least partly in front of the open gap of the grasping hook and, when the grasping hook has been pivoted away from this position, the projection allows the open gap in the hook to remain at least substantially open.

In the equipment in accordance with the invention the hook part is attached to the hook frame as pivotable around an articulated joint. In such a case, gravity or other external forces pivot the hook to its position in each particular case. This results in the advantage that the hook is turned very little in relation to the arc of the platform, whereby the abrasion both of the hook and of the arc are reduced essentially. When the articulated joint in the hook is provided with a bearing, the joint withstands the pivoting movement without wear.

The stationary projection on the hook frame, e.g. a stationary plate fixed to the frame, acts as a safety lock, whereby the arc of the platform can come out of the hook only at one extreme position of the loading movement, when the platform has been lowered off the vehicle.

A highly reliable operation of safety lock is obtained for the equipment in accordance with the invention. It is a further advantage that, in some cases, the power of pulling on is increased, because the hook hangs down in the situation concerned.

Figure 2:
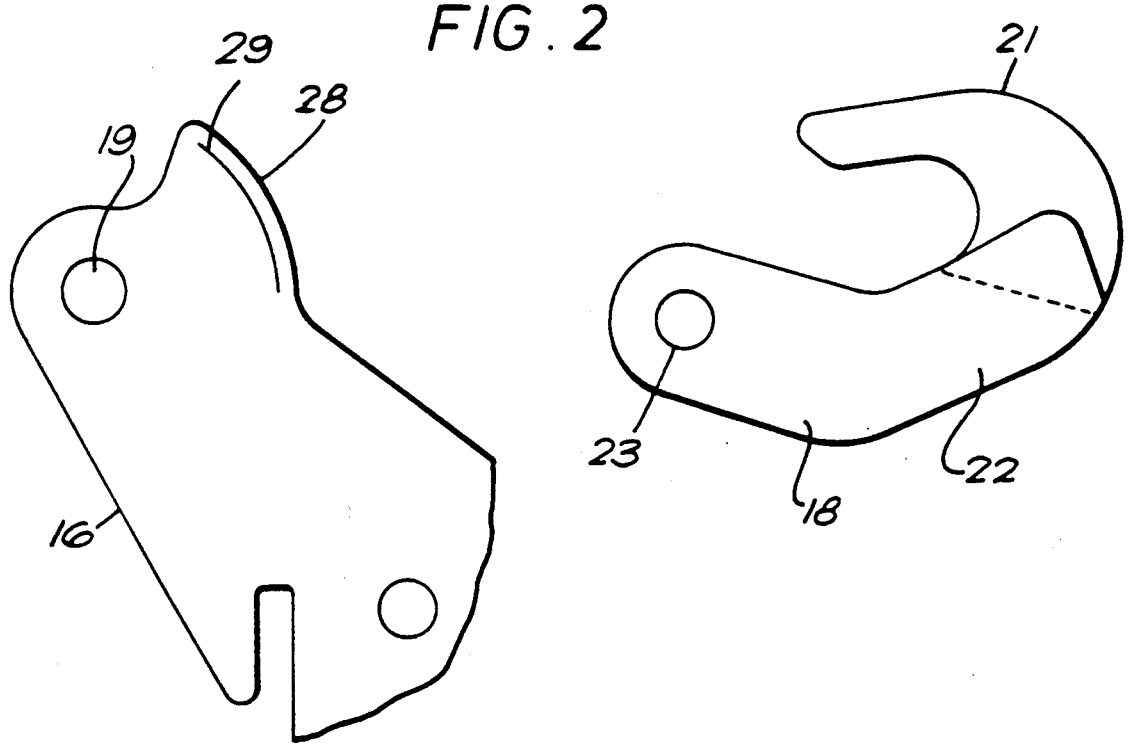
Figure 3:
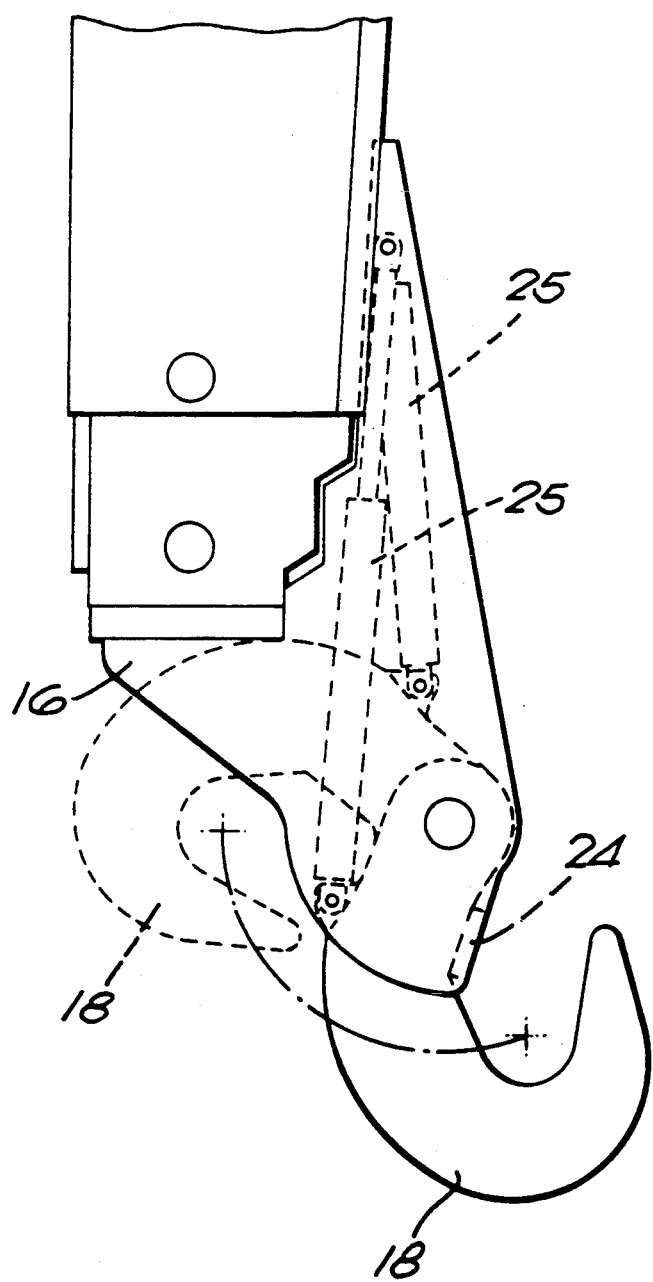
Figure 4:
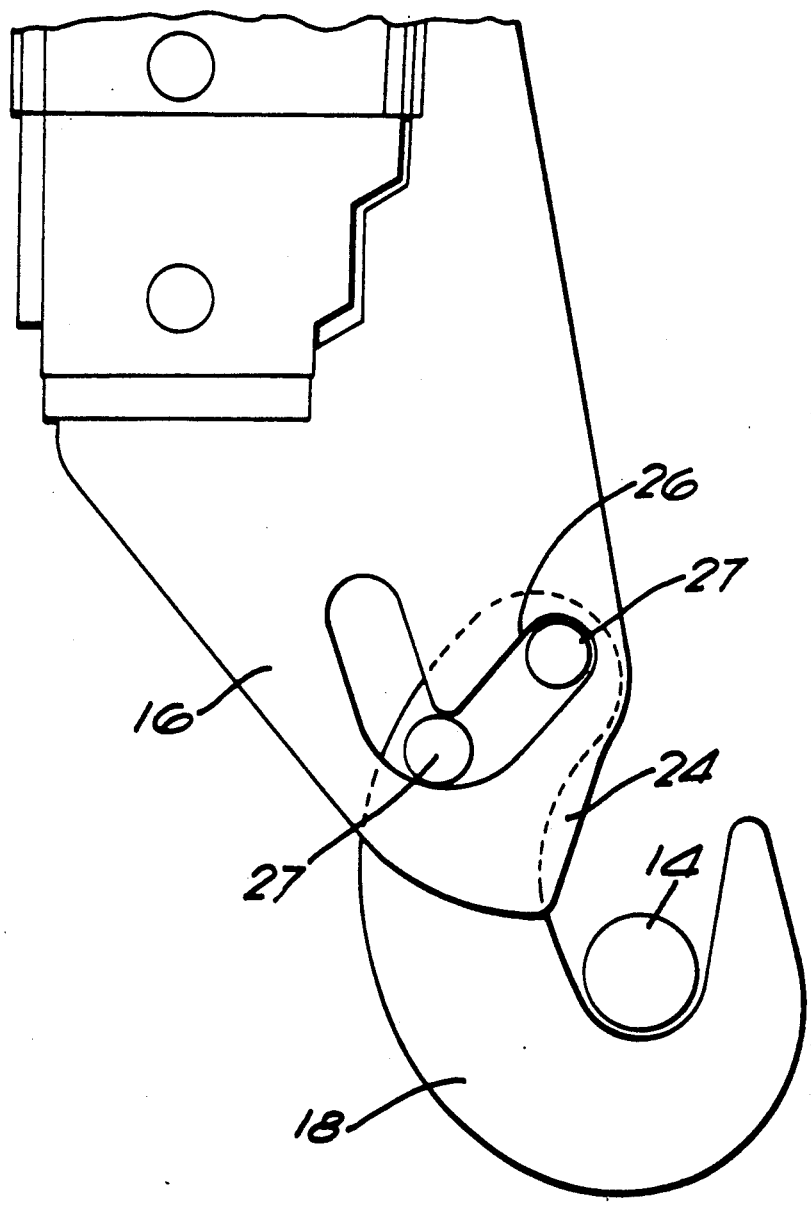

The invention and its details will be described in more detail in the following with reference to the accompanying drawings, wherein FIG. 1 shows the device in accordance with the invention in different positions, and FIG. 2 shows the frame part and the hook part of the hook as detached from each other, FIG. 3 shows one embodiment of the invention with the hook part in two different positions, and FIG. 4 shows a second embodiment of the invention.

FIG. 1 shows the loading device in different positions. The loading device itself, with the exception of the grasping hook and of the frame part of the hook, is known in itself, e.g. similar to that described in the FI Patent No. 63,350. The loading device comprises a rear frame 2, which pivots around a rearmost transverse articulation shaft 1, a middle frame 4, which is attached to the front end of the rear frame as pivotable around a transverse articulation shaft 3, as well as an L-shaped piece 6, which is attached to the front end of the middle frame as pivotable around a transverse articulation shaft 5. Thereby the articulation shaft 5 is fitted at the rear end of the horizontal arm 7 of the L-piece 6. The displacing of the parts around the articulated joints 1, 3 and 5 takes place by means of actuators, i.e. hydraulic cylinder-piston devices 8 and 9. The upper end of the vertical arm 10 of the L-piece is provided with a grasping hook 11.

The loading of an exchange platform 13 resting on the ground 12 onto a vehicle takes place so that the middle frame 4 with the L-piece 6 is pivoted around the shaft 3 rearwards, and the grasping hook 11 is fitted into the grasping loop or arc 14 placed at the upper part of the front edge of the platform 13. Hereupon the middle frame with the L-piece is pivoted back to the front. The path of movement of the grasping hook is denoted with the dashed-dotted line 15. At the front end of the path of movement there is a horizontal part, which is achieved by pivoting the L-piece around the shaft 5. The lowering of the platform off the vehicle onto the ground takes place in the reversed sequence.

In FIG. 1, by means of the piece at the top in the figure, a dumping position is also shown, wherein the rear frame 2 and the middle frame 4 of the loading device are locked rigidly as extensions of one another.

In the equipment in accordance with the invention, the grasping hook 11 consists of a hook frame 16 and of a tip, i.e. the hook part 18 itself, attached to the hook frame as pivotable around a transverse articulated joint 17. As is seen from FIG. 1, when the L-piece pivots, the hook part 18 can pivot relative the hook frame by means of the articulated joint 17 rearwards and downwards by the effect of its own weight and/or of the weight of the exchange platform suspended on the hook. The hook frame 16 is attached rigidly, e.g. by means of two bolts, to the vertical arm 10 of the L-piece, or it may also be made of one piece with the vertical arm.

The more detailed constructions of the hook frame 16 and of the hook part 18 come out from FIG. 2. In the front part of the upper end of the hook frame 16 there is a hole 19 for an articulation pin. Behind the articulation point 19, there is a projection 28 on the hook frame. The hook part 18 consists of a massive tip part 21 and of two side plates 22 attached to the sides of the tip part. The space between the side plates is free. At the upper end of the front part of the hook part 18 there is a corresponding hole 23, through which the articulation pin to be attached to the hole 19 in the hook frame is fitted. After the hook part 18 has been pivoted around its articulated joint rearwards and downwards, the projection 28 on the hook frame 16 is positioned between the side plates 22 of the hook facing the open gap in the hook, thereby closing the gap. Thereby the grasping loop on the platform remains stationary in the gap. This safety-lock area is denoted with the arc 29 in FIG. 2.

In the final stage of lowering, the L-piece 6 and the hook frame 16 have been pivoted upside down (the position shown at the extreme right in FIG. 1). In such a case the hook frame 16 has been pivoted relative the hook part 18, which hangs down free, so that the projection 24 leaves the gap in the hook open and the hook can be detached from the arc 14 on the platform.

The invention is not confined to the embodiment described above alone, but it may show variation in different ways within the scope of the patent claims. At both of the extreme positions of the hook it is possible to provide limiters of the movement, said limiters permitting movement of the hook within a certain sector alone. Between the hook part 18 and the hook frame 16 a spring may be attached, which pushes the hook part towards the open position when the load of a weight does not act upon the hook. This facilitates the attaching to, and detaching from, the platform. The spring force is adequate to push an unloaded hook to an opened extreme position, but it is not strong enough to displace a loaded hook.

Such an embodiment is shown in FIG. 3, wherein a hook provided with a gas spring 25 is shown. The hook frame 16 consists of two side plates, between which there are both the hook part 18 and the spring 25. The projections 24 are fitted in the side plates of the hook frame 16.

The hook part 18 may also be provided with positively controlled movements by means of a hydraulic or pneumatic cylinder. Such an actuator may be arranged to pivot the hook either during the entire transfer movement or, alternatively, during part of the time, in which latter case a part of the movement of the hook takes place by the effect of gravity.

The pivoting of the hook may also be guided by means of the groove-pin combination shown in FIG. 4. In the side plate of the hook frame 16 there is a V-shaped recess or groove 26, into which the two pins 27 provided on the hook part 18 fit. This arrangement guarantees that the hook part is always turned to the open position when the force acting upon it is parallel to the hook frame 16.

Of course, such a guide groove may also be arranged in the opposite way, i.e. by fitting the groove in the hook part and the pins on the frame part. Besides being V-shaped, the shape of the groove may also be curved. In such a case the pins can be substituted for by a curved ridge fitting into the curved groove.

As the guide means it is also possible to use various linkage mechanisms, on which the hook is suspended. In such a case the hook is not pivoted around one pivot shaft 17 alone.

In the embodiment shown in FIG. 1, horizontal shifting of the load is produced by pivoting the L-piece 6 around the shaft 5. A corresponding movement of transfer can also be accomplished by shifting the L-piece telescopically in relation to the middle frame 4.

Besides being fixed to the hook frame stationarily, the safety-lock plate itself may also be pivoting, e.g., by means of gravity or by means of an actuator. In any case, it is essential that, when the hook part 18 pivots around the shaft 17, at the same time it pivots relative the safety lock.

When the tip part 18 of the hook is pivoting, the arm 10 of the hook may also be made longer. In such a case, when the platform is engaged, the middle frame 4 does not have to be pivoted equally far towards the rear as in the prior-art equipment in use at present, and the pulling-on power is higher at the beginning of the lifting movement.

When the arm of the hook is longer, by means of the same device it is possible to handle platforms with different grasping levels. The provisions applicable in different countries in respect of the height of the grasping loop show a great deal of variation.

Above, the words front end/rear end, upper end/lower end, and vertical part/horizontal part have been used. These phrases refer to the positions of the parts concerned in the transportation position of the loading device, i.e. to the position of the L-piece shown at the extreme left in FIG. 1.

The closed position of the hook means such a position wherein the projection of the hook frame closes the gap of the hook part so that the open gap between the projection and the hook part is smaller than the thickness of the grasping loop on the cargo space. In a corresponding way, the open position of the hook refers to a position wherein this open gap is larger than the thickness of the grasping loop.

What is claimed is:

1. Equipment for transferring cargo space onto and off of a vehicle comprising:
   frame means pivotable about a transverse pivot axis;
   an L-shaped piece having first and second arms positioned at substantially 90 degrees from each other, said second arm of said L-shaped piece being connected to said frame means;
   actuator means for pivoting said frame means around said transverse pivot axis;
   a grasping hook disposed at an attachment location at one end of said first arm, said hook having a gap;
   fixed projection means for locking said hook, said projection means being disposed towards one end of said first arm of said L-shaped piece;
   said grasping hook being pivotable such that, during pivoting movement, said hook simultaneously pivots relative to both said projection means and said first arm, said grasping hook being pivotable between a first forwardly facing position wherein said gap of said grasping hook is substantially closed by said projection means to transport said cargo space and a second position wherein said gap is substantially unobstructed to grasp and release said cargo space; and,
   said attachment location being disposed in said first arm such that said projection means is oriented beneath said attachment location when said grasping hook is in said second position.

2. Equipment for transferring cargo space according to claim 1, wherein said L-shaped piece is pivotally connected through one end of said second arm to said frame means at a pivot axis, said L-shaped piece being pivotable between a first position for transportation of said cargo space and a second position for grasping and releasing said cargo space, said first and second position of said L-shaped piece corresponding to said first and second position of said grasping hook.

3. Equipment for transferring cargo space according to claim 2, wherein said projection means is disposed at one end of said first arm such that said projection means is oriented adjacent to and above said attachment location when said L-shaped piece is in said first position.

4. Equipment for transferring cargo space according to claim 3, further comprising resilient member means for pivoting said grasping hook to said second position, said resilient means being connected between said first arm and said grasping hook.

5. Equipment for transferring cargo space according to claim 2, further comprising resilient member means for pivoting said grasping hook to said second position, said resilient means being connected between said first arm and said grasping hook.

6. Equipment for transferring cargo space according to claim 1, further comprising resilient member means for pivoting said grasping hook to said second position, said resilient means being connected between said first arm and said grasping hook.

7. Equipment for transferring cargo space according to claim 1, wherein said attachment location includes a pivot shaft around which said hook pivots relative to both said projection means and said first arm.

* * * * *